United States Patent [19]

Danielli

[11] Patent Number: 4,625,429
[45] Date of Patent: Dec. 2, 1986

[54] APPARATUS FOR CHECKING THE ROUNDNESS OF ROTATING PARTS

[75] Inventor: Franco Danielli, Zola Predosa, Italy

[73] Assignee: Finike Italiana Marposs S.p.A, S. Marino di Bentivoglio, Italy

[21] Appl. No.: 737,055

[22] Filed: May 23, 1985

[30] Foreign Application Priority Data

May 28, 1984 [IT]  Italy ............................ 3475 A/84

[51] Int. Cl.$^4$ ............................................. G01B 7/12
[52] U.S. Cl. ......................................... 33/504; 33/550
[58] Field of Search ................. 33/504, 550, 555, 549, 33/551

[56] References Cited

U.S. PATENT DOCUMENTS 3,274,693  9/1966  Witzke .
4,055,027  10/1977  Freddi .
4,389,787  6/1983  Solaroli ............................ 33/504 X Primary Examiner—William D. Martin, Jr.
Attorney, Agent, or Firm—Stevens, Davis, Miller & Mosher

[57] ABSTRACT

An apparatus for checking the roundness of parts comprises a basement supporting a motorized spindle for rotating the part to be checked about a horizontal axis, a stanchion fixed to the basement, a control lever and a support element rotatably coupled to the stanchion for rotation about relevant horizontal axes, measuring device coupled to the lever and the support element, and processing device. The measuring device comprises a member vertically suspended to the lever and rotatably coupled to the support element, a Vee device fixed to the member and adapted to be arranged upon the part and two measuring heads with movable feelers adapted to contact diametrically opposed points of the part. The processing device is connected to the measuring heads for providing measurements of the out-of-roundness and of the diameter of the part.

14 Claims, 7 Drawing Figures ured parts with constant diameter, i.e. parts with exactly round cross-sections or with an odd number of lobes. However, parts with an odd number of lobes are frequently obtained and, as machining goes on, the
APPARATUS FOR CHECKING THE ROUNDNESS OF ROTATING PARTS

BACKGROUND OF THE INVENTION

1. Field of the Invention

The present invention relates to an apparatus for checking the roundness of rotating parts, comprising: support means; control means mounted on the support means for supporting and rotating the part to be checked; measuring means adapted to cooperate with the part for providing at least one signal indicative of the radial dimensions of the part, the measuring means including a substantially rigid support device, two elements fixed with respect to the support device and gauging means fixed to the support device, the two fixed elements being adapted to remain into stable contact with the part; and processing means connected to the gauging means for providing an indication of the out-of-roundness of the part.

2. Description of the Prior Art

So far, the roundness of mechanical parts has been checked, almost exclusively, by means of laboratory instruments comprising a high precision spindle for rotating the part, a measuring head fixed with respect to the spindle support for measuring the radial dimensions of the rotating part and an electronic processing and indicating unit for providing indications of the out-of-roundness as well as, possibly, a chart trace of the part.

These laboratory instruments are rather expensive, fragile and slow. Accordingly, they are not suitable for checking, in workshop environment, high volume productions. Moreover, as mentioned before, they require a high precision spindle, because displacements of the spindle axis cause measurement errors.

U.S. Pat. No. 3,274,693, that mentions these laboratory instruments, describes an apparatus more suitable for roundness checking in workshop environment. This apparatus comprises a spindle that may be of limited precision, at least a pair of Vee devices (with different V-angles) adapted to remain into contact with the surface of the rotating part and gauge probes, each coupled to a relevant Vee device and arranged along the bisector of the Vee device for gauging the radial dimensions of the part in different cross-sections. In the above mentioned U.S. patent it is stated that, by using two Vee devices and relevant gauge probes and by suitably choosing the V-angles and a particular processing of the measurement results, it is possible to measure with satisfactory accuracy the out-of-roundness of parts having three to nine lobes.

The apparatus of U.S. Pat. No. 3,274,693 involves several drawbacks. In order to obtain high accuracy it is necessary to provide a plurality of Vee devices and relevant probes. This involves problems with regard to overall dimensions and cost, the difficulty of guaranteeing the continuous and stable contact between the Vee devices and the part, the necessity of determining empirical factors indispensable for the processing. Moreover, it is impossible to check, with the same apparatus, the part diameter.

The measurement of the out-of-roundness of parts is particularly advisable for parts machined on centerless grinding machines. These machines normally provide machined parts with constant diameter, i.e. parts with exactly round cross-sections or with an odd number of lobes. However, parts with an odd number of lobes are frequently obtained and, as machining goes on, the out-of-roundness tends to increase. Therefore, it is important to immediately detect these errors for changing and correcting the set-up of the grinding machine and/or the machining cycle.

U.S. Pat. No. 4,055,027 discloses a gauging head having two feelers for checking the diameter of parts machined on a centerless grinder. The head is arranged so as to check the diameter of the part. At least in theory, one could think to use the head also for checking out-of-roundness errors due to lobing of even order (however, as already mentioned, these errors do not occur in centerless grinders), but the arrangement of the head, that in measuring position is fixed with respect to the grinding machine, makes checking of errors due to lobing of odd order impossible.

SUMMARY OF THE INVENTION

It is an object of the present invention to provide an apparatus capable of checking the roundness of rotating parts, in workshop environment, too, and that does not suffer from the drawbacks of the known instruments.

Another object of the invention is to provide an apparatus of suitable sturdiness capable of checking, in workshop environment, the roundness of rotating parts without any need of using precision spindles, with reduced checking times, overall dimensions and costs.

A subordinate object of the invention is to provide an apparatus also capable of checking the diameter of the parts and that permits both partially automatic operation and wholly automatic operation, through the provision of suitable devices, in particular for loading, unloading and possibly selecting the parts.

A further object of the invention is to provide an apparatus for roundness checking that is particularly, but not exclusively, adapted to check parts machined in centerless grinding machines.

According to the present invention, an apparatus for checking the roundness of rotating parts comprises: support means; control means mounted on the support means for supporting the part to be checked and rotating it about an axis; measuring means including a support device, two measuring heads fixed to the support device and adapted to cooperate with diametrically opposed points of the part for providing relevant measurement signals, and two elements fixed to the support device, these elements being arranged on the same side with respect to the geometric plane defined by said axis and by the straight line passing through said diametrically opposed points and being adapted to remain into stable contact with the part; and processing means receiving the signals of the measuring heads for calculating the out-of-roundness of the part depending on the difference between the maximum and minimum values of a linear combination of said signals.

BRIEF DESCRIPTION OF THE DRAWINGS

A preferred embodiment of the invention is now described in more detail, by way of example only, with reference to the annexed drawings, in which.

DESCRIPTION OF THE PREFERRED EMBODIMENT

Figure 1:
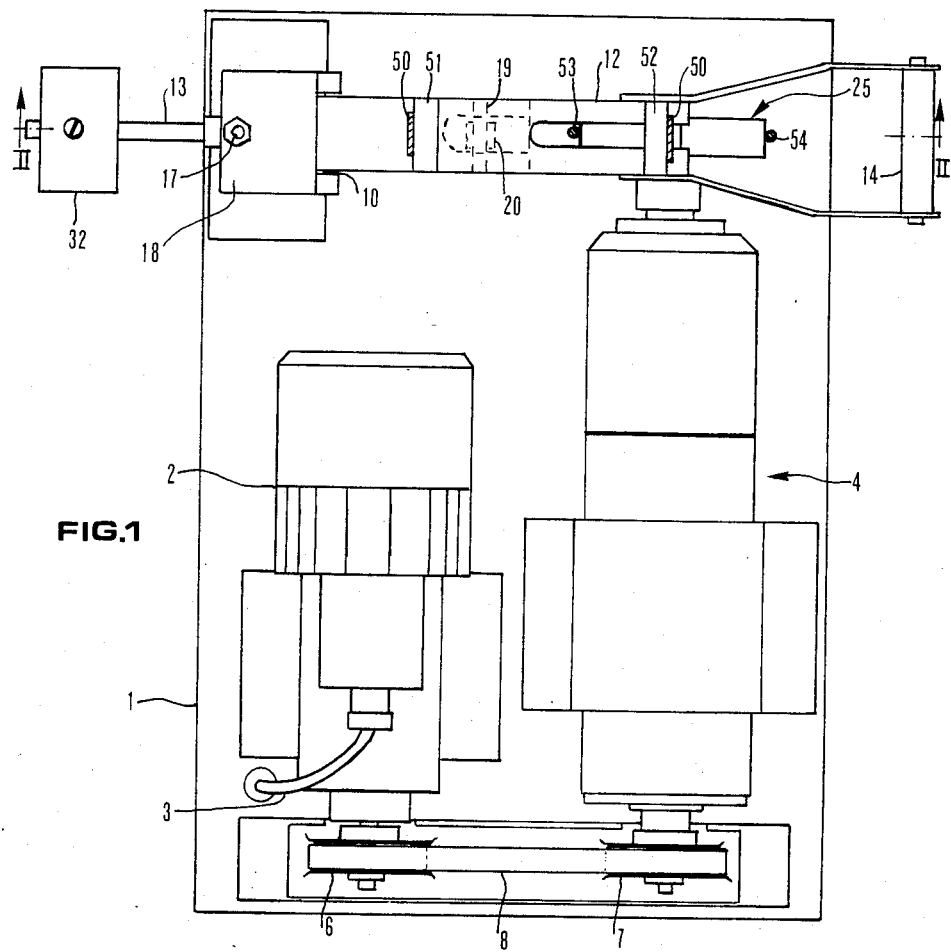
FIG. 1 is a top view of a semi-automatic apparatus for checking the roundness of rotating parts.
Figure 2:
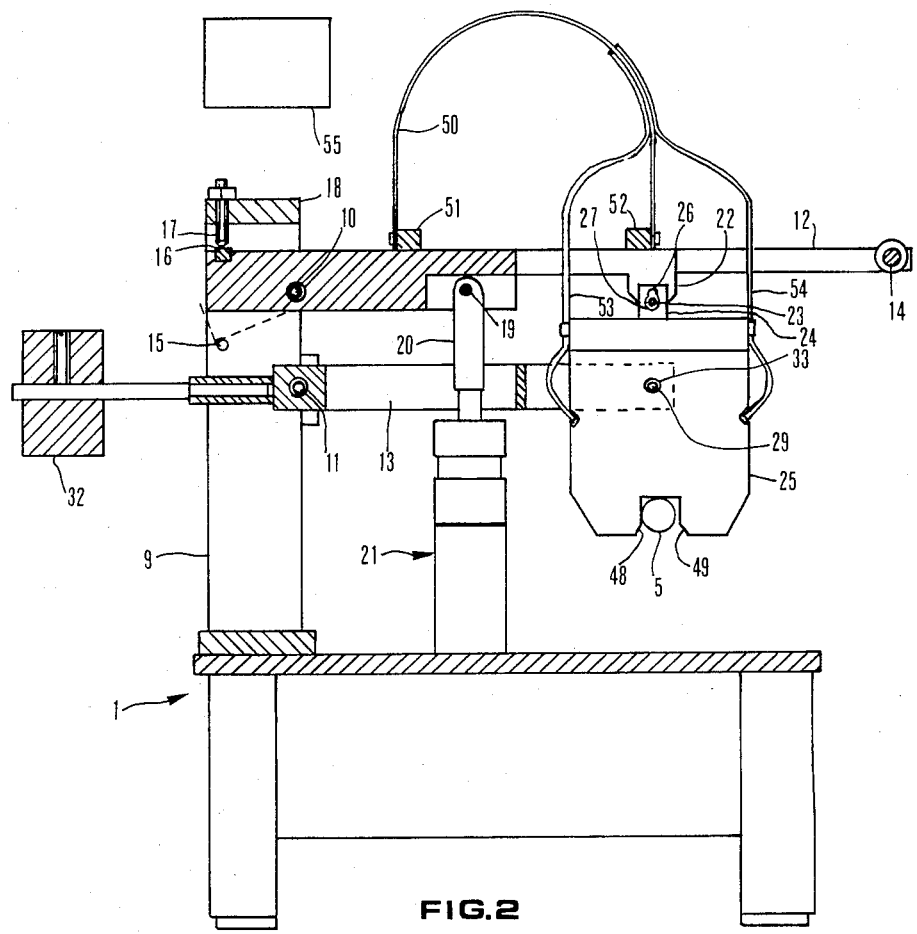
FIG. 2 shows a partial section of the apparatus along plane II—II of FIG. 1.

With particular reference to FIGS. 1 and 2, the apparatus comprises support means, basically consisting of a base 1 on which there are mounted control means including an electric motor 2 receiving electrical power through a cable 3, a spindle 4 for supporting the part 5 to be checked and rotating it about a horizontal axis, and a driving system coupling motor 2 to spindle 4.

The driving system comprises a driving pulley 6, a driven pulley 7 and a belt 8, transmitting motion from driving pulley 6 to driven pulley 7 and thus to spindle 4.

Mounted onto a stanchion 9 fixed to base 1 are two pins 10, 11, which define horizontal and parallel axes of rotation.

A lever 12 is mounted for rotation about pin 10 and an arm or support element 13 is mounted for rotation about pin 11. Lever 12, that can be manually operated through a handle 14, has a rest position, defined by the contact between a lower surface of the lever 12 and a stop 15 fixed to stanchion 9, and a measurement position, defined by the contact between a precision stop 16, fixed to the upper surface of lever 12, and the end of a screw 17 adjustably fixed to a plate 18 joined to stanchion 9. In FIG. 2 the measurement position of lever 12 is shown by continuous lines, while the rest position of lever 12 is partially shown by dashed line.

Fixed to lever 12 is a pin 19 defining an axis of rotation parallel to those defined by pins 10 and 11. A rod 20 of a hydraulic or pneumatic damper 21, that is supported by base 1, can rotate about pin 19. Damper 21 is provided for dampening the motion of lever 12, in order to prevent too strong impacts against stop 15 and screw 17.

Lever 12 has two flanges 22, one of which is visible in FIG. 2, and a pin 23, that defines a geometric axis of rotation parallel to those defined by pins 10, 11 and 19, has its ends fixed to flanges 22.

Pin 23 passes through the opening of an eye hook 24 fixed to a substantially rigid support member or device 25. Said opening has a first open cylindrical surface 26 having diameter slightly larger that that of pin 23 and a second open cylindrical surface 27, connected to surface 26. The diameter of second surface 27 is larger than that of the surface 26 for reasons that shall be explained later.

Figure 3:
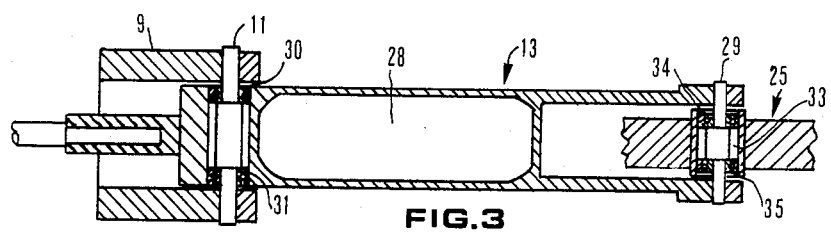
FIG. 3 is a horizontal section of a detail of the apparatus, with enlarged scale with respect to FIGS. 1 and 2.

Support element 13 has an opening 28, visible in FIG. 3, that permits the passage of rod 20 of damper 21, and a forked end that supports a pin 29 defining a geometrical axis of rotation parallel to the axes defined by pins 10, 11, 19 and 23.

An intermediate section of element 13 is coupled, through ball bearings 30, 31, to pin 11 and a second end of element 13 supports, in a longitudinally adjustable way, a counterweight 32, visible in FIGS. 1 and 2.

Figure 4:
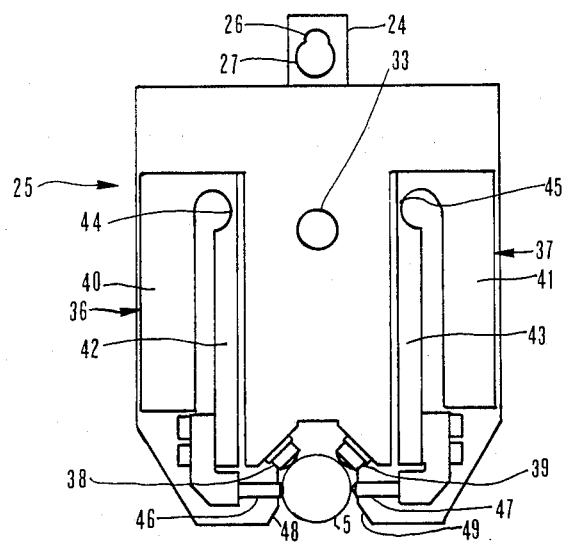
FIG. 4 shows, with scale enlarged in comparison with FIGS. 1 and 2, a front elevation of another detail of the apparatus, i.e. a support device adapted to remain into contact with the rotating part and to support measuring heads.

Support device 25 has a hole 33, visible in FIGS. 3 and 4, for the passage of pin 29 and is coupled to pin 29 though ball bearings 34, 35. Support device 25 passes freely through the opening defined by the forked end of support element 13.

The measuring means of the apparatus are basically defined by support device 25, by two electronic measuring or gauging heads 36, 37 fixed to support device 25 and by two contact elements or fixed feelers 38, 39 locked to support device 25.

Measuring heads 36, 37, visible in FIG. 4, comprise two portions 40, 41 fixed to support device 25, two movable arms 42, 43 rotatable about fulcrums 44, 45, two feelers 46, 47 adapted to touch diametrically opposed points of part 5, and two transducers—not shown for simplicity's sake—which provide measurement signals representative of the positions of feelers 46, 47 and of movable arms 42, 43 with respect to relevant zero-setting positions.

Since measuring heads 36, 37 are of comparative type, the displacements of feelers 46, 47 are of limited amplitude and therefore it may be assumed, with sufficient approximation, that feelers 46, 47 move along a horizontal line passing through the center of part 5.

Contact elements 38, 39, that are arranged on the same side with respect to the geometric plane substantially defined by the geometric axis of part 5 and by the straight line passing through feelers 46, 47, are arranged in such a way that the straight lines passing, in the plane of FIG. 4, through the center of the cross-section of part 5 and through the points of part 5 touched by contact elements 38, 39, define angles of 45° with respect to the horizontal straight line passing through feelers 46, 47.

Support device 25 also defines an open lower end, V-shaped, with two chamfers 48, 49 having the purpose of making easier the arrangement onto part 5.

A resilient lamina 50, shown in FIG. 2 and shown cross-sectioned in FIG. 1, has its ends fixed to lever 12 through blocks 51, 52, so as to take, substantially, the shape of an overturned U. Lamina 50 supports and guides cables 53, 54 of heads 36, 37 for preventing these cables from hindering the displacements of the support device 25 that will be described later. Cables 53 and 54 are partially shown in FIG. 2 and are shown cross-sectioned in FIG. 1.

An electrical unit 55, connected to motor 2 and—through cables 53 and 54—to the transducers of heads 36, 37, provides the power supply and contains circuit means for control, amplification, detection and processing, as well as suitable indicating devices for displaying, in particular, the value of the diameter of part 5, the amount of the out-of-roundness, the tolerance limits, etc.

In particular, the diameter of part 5 is detected by the processing means depending on the sum of the signals provided by heads 36 and 37, while out-of-roundness is calculated through the following processing:

$$M = [\tfrac{1}{2}(A - B)]_{MAX} - [\tfrac{1}{2}(A - B)]_{min} \qquad (1)$$

where A and B are, respectively, the measurement signals provided by measuring heads 36 and 37 during the rotation of part 5.

Figure 5:
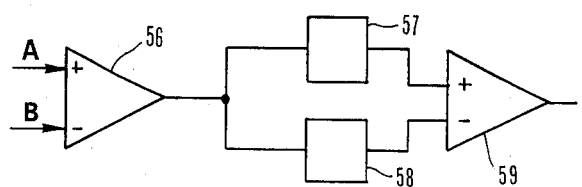
FIG. 5 is a diagram of a processing circuit of the apparatus of FIGS. 1 to 4.

The very simple analog circuit of FIG. 5, that may be included in the processing means of unit 55, is capable of performing the processing (1).

Differential amplifier 56 receives at its inputs signals A and B and provides at its output the signal $\tfrac{1}{2}$ (A-B) that reaches a maximum detecting circuit 57 and a minimum detecting circuit 58. The outputs of circuits 57 and 58 reach the inputs of a differential amplifier 59 the output of which provides a voltage representative of the value M according to processing (1).

The mechanical operation of apparatus of FIGS. 1 to 4 will now be described.

When lever 12 is in its rest position, i.e. into contact with stop 15, the part 5 to be checked is inserted into spindle 4. Thereafter, by suitable push-buttons of electric unit 55, chucking of spindle 4 is controlled as well as the operation of motor 2, that makes spindle 4 rotate in a determined direction and at a determined speed.

When lever 12 is in its rest position, the distribution of the weights of support device 25, support element 13 and counterweight 32 is such that pin 23 is into contact with cylindrical surface 26.

Then the operator rotates, through handle 14, lever 12 in clockwise direction causing lowering of support device 25 toward part 5.

Support device 25 in turn makes support element 13 rotate clockwise, due to the coupling through pin 29.

The distribution of the weights guarantees the insertion of support device 25 onto part 5 with its longitudinal axis substantially intersecting the geometric axis of part 5.

Shortly before the end of the travel of lever 12, fixed feelers 38, 39 touch part 5. The further displacement of lever 12, up to the contact between stop 16 and screw 17, causes an upward displacement of eye hook 24 with respect to pin 23 that consequently is arranged in correspondence with cylindrical surface 27. This also happens if one of chamfers 48, 49 comes into contact with part 5, due to a wrong orientation of support device 25. In this case, too, pin 23 comes out from cylindrical surface 26 and consequently support device 25 may take a proper position by rotating about pin 29. The displacements of support device 25 about the axis of pin 29 are limited by cylindrical surface 27.

The floating suspension arrangement of support device 25 guarantees that, during the rotation of part 5, fixed feelers 38, 39—as well as, of course, movable feelers 46, 47—remain into contact with part 5 even if the part is affected with out-of-roundness.

In view of the above, it is evident that the coupling device between lever 12 and support device 25 renders, during the real measurement operation, support device 25 substantially uncoupled from lever 12. Therefore, support device 25 may oscillate about pin 29 in such a way that fixed feelers 38 and 39 remain permanently into contact with part 5, with a substantially constant contact force, determined by the distribution of the weights of support device 25, element 13 and counterweight 32.

Fixed feelers 38, 39 substantially define a Vee rest, with a V-angle of 90°. This angle provides the same ease of settling for support device 25 onto part 5, both in horizontal and vertical direction.

It is evident that the apparatus may be wholly automatized through the provision of a device for automatically loading and unloading the parts, of suitable limit switches and of logic and control circuits, in order to permit automatic checking of all the parts machined by a centerless grinding machine. Moreover, the apparatus may be modified for permitting checking of the out-of-roundness in correspondence with different cross-sections of a part. For this purpose it is possible to use, for example, an axially movable spindle.

As already mentioned, some of the main advantages of the apparatus according to the invention reside in the possibility of obtaining accurate measurements through a simple structure of small overall dimensions that also guarantees a very good positioning of the measuring means with respect to the part, without being detrimentally influenced by possible displacements of the axis of spindle 4.

Figure 6:
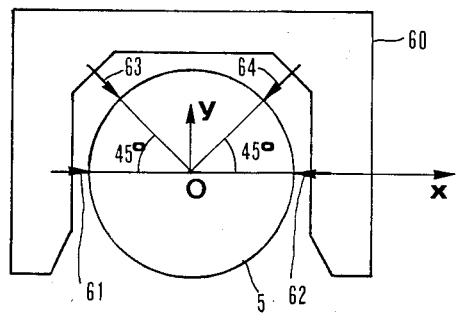
FIG. 6 and FIG. 7 are explicative of the operation of the apparatus of FIGS. 1 to 5.

With reference to the diagram of FIG. 6, it is now demonstrated that casual displacements of the rotation axis of part 5 caused by a spindle 4 of low precision do not influence the processing of the measurements.

In FIG. 6, reference numeral 60 indicates a support device that may be considered fixed, numerals 61, 62, 63 and 64 the feelers of four gauging heads providing relevant comparative measurement signals A, B, C and D and reference letter O indicates the intersection between the plane of the figure and the axis of the spindle supporting part 5. It is assumed that the straight lines passing through point O and, respectively, feelers 63 and 64 define angles of 45° with the horizontal straight line passing through feelers 61 and 62.

With the arrangement of FIG. 6, the out-of-roundness of part 5 can be measured, at least approximately, while the part is driven into rotation, by means of the following measurement processing:

$$M = \left[ \tfrac{1}{2}(A - B) + \frac{1}{2\sqrt{2}} (D - C) \right]_{MAX-min} \quad (2)$$

where MAX-min indicates the difference between the maximum and minimum values of the expression within the square brackets.

If the axis of part 5 (not rotating) undergoes a displacement $\Delta x$ along the horizontal axis passing through O, by assuming that initially signals A, B, C and D have zero values, the displacement makes said signals take the following values:

$A = \Delta x \cdot \cos 0° = \Delta x$ $B = \Delta x \cdot \cos 180° = -\Delta x$ $C = \Delta x \cdot \cos 45° = \Delta x \cdot \dfrac{\sqrt{2}}{2}$ $D = \Delta x \cdot \cos 135° = -\Delta x \cdot \dfrac{\sqrt{2}}{2}$ By substituting these values in expression (2) is is seen that $M = O$, and this demonstrates that horizontal deviations of the spindle do not influence the result of the checking.

Similarly, as a consequence of a deviation $\Delta y$ of the axis of part 5 along the vertical axis y passing through O one obtains:

$A = \Delta y \cdot \cos 90° = 0$ $B = \Delta y \cdot \cos 90° = 0$ $C = \Delta y \cdot \cos 135° = -\Delta y \cdot \dfrac{\sqrt{2}}{2}$ $$D = \Delta y \cdot \cos 135° = -\Delta y \cdot \frac{\sqrt{2}}{2}$$

Therefore, in this case, too, M=0.

Thus it is seen that the processing according to the expression (2) is not influenced by deviations of the spindle along any direction.

On the other hand, the measuring arrangement according to FIGS. 1 to 4 is perfectly equivalent to that of FIG. 6. In the case of FIGS. 1 to 4 movable feelers 63 and 64 of FIG. 6 are replaced by fixed feelers 38 and 39 that remain permanently into contact with part 5, during the measurement operation. Therefore, by using expression (2) for the apparatus of FIGS. 1 to 5 one obtains D=C=0 and accordingly expression (1) is applicable.

In substance, by using the apparatus of FIGS. 1 to 5, the mutual position between the center of part 5 and support device 25 changes during the part rotation due to the presence of lobes and the displacements measured by measuring heads 36 and 37 are originated.

The simplified measurement expression (1) has also the physical meaning of the maximum horizontal deviation of the apparent center of part 5 with respect to the bisector of the Vee rest defined by fixed feelers 38 and 39.

The processing according to expression (1) has also the following useful properties. If initially measuring heads 36 and 37 are correctly zero-set, the maximum and minimum values of the difference (A-B) are symmetrical with respect to the zero-value. Moreover, the values (that, if an out-of-roundness is present, are variable) of the difference (A-B) do not depend on the actual value of the diameter of part 5, i.e. the difference (A-B) oscillates about zero.

It is now demonstrated that the expression (2) permits the exact measurement of out-of-roundness errors due to the presence of lobing errors of the third and fifth order.

The out-of-roundness error in a cross-section of a part can be defined as the maximum deviation of the actual profile of the cross-section from the corresponding perfectly round profile of the hole with which the cross-section of the part matches without any play.

Figure 7:
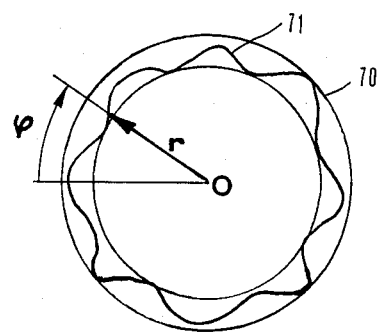

With reference to FIG. 7, where letter O indicates the center of said circular cross-section of the hole, indicated by reference numeral 70, letter r indicates the distance of the points of the perimeter of part 71 from point or center O and letter $\phi$ indicates the angle defined by a horizontal axis and segment r, the length of segment r, i.e. of radius r, may be expressed by a Fourier harmonic series as follows:

$$r(\phi) = r_o + \sum_{1}^{\infty} [m_i \sin(i \cdot \phi) + n_i \cos(i \cdot \phi)] \quad (3)$$

where: $r_o$ is half of the sum between the radius of said hole 70 and the minimum of part 71, and $$\sqrt{m_i^2 + n_i^2} = l_i \quad (4)$$

is the amplitude of a half-wave of the i.th harmonic.

As a matter of fact, if one chooses as reference point O the center of said hole 70, the harmonic of the first order has amplitude equal to zero, i.e.:

$$m_i = n_i = l_i = 0 \quad (5)$$

Further, by assuming that part 71 has only one regular lobing of the ith-order and that the origin of the arguments ($\phi$=o) is taken in correspondence with the apex of a lobe, it follows that:

$$m_i = 0; \; n_i = l_i \quad (6)$$

hence:

$$r(\phi) = r_o + l_i \cos i \cdot \phi \quad (7)$$

with i=2, 3, 4, etc.

It may be easily demonstrated that, by indicating with $e_i$ the out-of-roundness error, the following equation is valid:

$$r(\phi) = r_o + (e_i/2)(i \cdot \phi) \quad (8)$$

For example, with reference to a perfectly 3-lobed part, by taking as origin of the arguments ($\phi$=o) the apex P of a lobe, it follows that:

$$r(P) = r_{MAX} = r_o = l_3 \cos(3 \cdot 0) = r_o + l_3$$

By indicating with Q the point of the profile of part 71 corresponding to $\phi$=60°, it follows that:

$$r(Q) = r_{min} = r_o + l_3 \cos(3 \cdot 60°) = r_o = l_3$$

Thus:

$$e_3 = r_{MAX} - r_{min} = 2 \cdot l_3$$

i.e.: $l_3 = (e_3/2)$, while generally equation (8) is valid.

Assume now to make a perfectly i-lobed part rotate within support device 60 of FIG. 6. It may be assumed that the axis of the spindle does not moves, since it has been demonstrated that the displacements of the axis of the spindle do not influence the processing (2).

Due to expression (8) and by considering that the measuring heads used provide comparative measurements, it is:

$$\left. \begin{array}{l} A = \Delta r_o + \dfrac{e_i}{2} \cos(i \cdot \phi) \\[4pt] B = \Delta r_o + \dfrac{e_i}{2} \cos[i(\phi + 180°)] \\[4pt] C = \Delta r_o + \dfrac{e_i}{2} \cos[i(\phi + 45°)] \\[4pt] D = \Delta r_o + \dfrac{e_i}{2} \cos[i(\phi + 135°)] \end{array} \right\} \quad (9)$$

By substituting (9) in equation (2) it follows that:

$$M = \frac{1}{2}\left\{ \frac{e_i}{2} \cos(i \cdot \phi) - \cos i \cdot (\phi + 180°)] + \right. \quad (10)$$

$$\frac{1}{2\sqrt{2}} \frac{e_i}{2} [\cos i \cdot (\phi + 135°) - \cos i \cdot (\phi + 45°)] \Bigg\}_{MAX-min}$$

Since it is:

$$\cos i\phi - \cos i \cdot (\phi + 180°) = 2 \sin i \cdot (\phi + 90°) \cdot \sin (i \cdot 90°)$$

$$\cos i(\phi + 135°) - \cos i \cdot (\phi + 45°) = -2 \sin i \cdot (\phi + 90°) \cdot \sin (i \cdot 45°)$$

by substituting the last two equations in equation (10), it follows that:

$$M = \left\{ \sin i \cdot (\phi + 90°) \cdot e_i \cdot \left[ \tfrac{1}{2}\sin i \cdot 90° - \frac{1}{2\sqrt{2}} \sin(i \cdot 45°) \right] \right\}_{MAX-min} \quad (11)$$

The term within square bracket is a coefficient K(i) that is only a function of the lobing order, while the term $\sin i \cdot (\phi + 90°)$ is a function of $\phi$ that varies, for any value of i, between $-1$ and 1, therefore the difference between its maximum and minimum values is equal to 2. Thus:

$$M = 2 \cdot e_i |K(i)| \quad (12)$$

By calculating K(i) through the expression $$K(i) = \left[ \tfrac{1}{2}\sin(i \cdot 90°) - \frac{1}{2\sqrt{2}} \sin(i \cdot 45°) \right] \quad (13)$$

it follows that:
K(2)=0.35; K(3)=0.5; K(4)=0; K(5)=0.5; K(6)=0.35; K(7)=K(8)=K(9)=0
hence, $$M = e_i \text{ for } i = 3 \text{ and } i = 5 \quad (14)$$

$$M = 0.7 \, e_i \text{ for } i = 2 \text{ and } i = 6 \quad (15)$$

$$M = 0 \text{ for } i = 4; i = 8; i = 9 \quad (16)$$

Accordingly, it follows that the measurement processings according to formulas (1) and (2) permit calculating exactly the lobing errors of third and fifth order, permit measuring only partially errors due to lobing errors of the second and sixth order an do not permit detecting errors due to lobing errors of fourth, seventh, eighth and ninth order.

Moreover, it may be demonstrated that the apparatuses of FIGS. 1-5 and 6 also permit measuring, at least approximately, errors due to irregular lobing errors, that is to lobes not evenly spaced.

The apparatus of FIGS. 1-5, with the processing according to equation (1), is particularly adapted to check parts machined in centerless grinding machines. In fact, as already mentioned, the parts machined by centerless grinding machines normally may have lobing errors of odd orders. The possibility of exactly measuring lobing errors of the third and fifth order through equation (1) is generally sufficient in practice. In fact, it was experimentally found that normally the out-of-roundness errors in parts machined by centerless grinding machines is due, for an amount of at least 80 percent, to lobing errors of the third and fifth order.

It is evident that, with simple and obvious modifications the apparatus of FIGS. 1 to 5 may be adapted to check the roundness of holes.

What is claimed is:

1. An apparatus for checking the roundness of rotating parts, comprising:
   support means;
   control means mounted on the support means for supporting the part to be checked and rotating it about an axis;
   measuring means including a support device, two measuring heads fixed to the support device and adapted to cooperate with diametrically opposed points of the part for providing relevant measurement signals, and two elements fixed to the support device, these elements being arranged on the same side with respect to the geometric plane defined by said axis and by the straight line passing through said diametrically opposed points and defining substantially a Vee rest adapted to remain into stable contact with the part, for positioning the support device and the measurement heads with respect to the rotating part; and
   processing means receiving the signals of the measuring heads for calculating the out-of-roundness of the part depending on the difference between the maximum and minimum values of a linear combination of said signals.

2. The apparatus according to claim 1, wherein said fixed elements are adapted to touch relevant points of the part lying in a second geometric plane containing said diametrically opposed points and wherein the straight lines joining the intersection point between the axis of rotation of the part and said second plane with, respectively, the points of the part touched by the fixed elements, define angles of 45° with the straight line passing through said diametrically opposed points.

3. The apparatus according to claim 2, wherein the processing means are adapted to calculate the out-of-roundness error of the part due to lobing errors of at least the third and fifth order through the formula:

$$M = [\tfrac{1}{2}(A - B)]_{MAX} - [\tfrac{1}{2}(A - B)]_{min}$$

where A and B are the relevant signals of the measuring heads.

4. The apparatus according to claim 1, wherein the measuring means and the processing means are adapted to dynamically check the diameter of the part.

5. The apparatus according to claim 1, wherein the support means comprise a base for supporting the control means, a lever movable with respect to the basement, and a connecting device for movably connecting the support device to the lever, the lever being adapted to displace the support device from a rest position to a measuring position, the fixed elements being into contact with the part in said measuring position.

6. The apparatus according to claim 5, wherein said connecting device is adapted to substantially uncouple the support device from the lever in the measuring position of the support device.

7. The apparatus according to claim 6, wherein said lever is coupled to the base for rotation about a first axis of rotation, the apparatus further comprising a support element coupled to the support device and to the base for permitting rotations of the support element with respect to the base and of the support device with respect to the lever, respectively about a second axis of rotation and a third axis of rotation, that are parallel to the first axis of rotation.

8. The apparatus according to claim 7, wherein the axis of rotation of the part is substantially horizontal, the apparatus further comprising a counterweight fixed at an end of the support element, the support element having a second end coupled to the support device, the support device being adapted to remain into contact with the part through said fixed elements, substantially under the action of the force of gravity.

9. The apparatus according to claim 8, wherein said connecting device defines first surfaces associated with the lever and the support device, said first surfaces defining a fourth axis of rotation, for the rotation of the support device with respect to the lever, and second surfaces associated with the lever and the support device for permitting uncoupling of the support device from the lever in the measuring position of the support device, the second surfaces limiting the rotational displacements of the support device about the third axis of rotation.

10. The apparatus according to claim 9, wherein the support device defines substantially V-shaped surfaces for facilitating the insertion of the support device onto the part to be checked.

11. The apparatus according to claim 10, wherein said lever has a handle for its manual operation and wherein a damping device is arranged between the lever and the basement.

12. An apparatus for checking the roundness of rotating parts, comprising:
a base;
control means supported by the base for rotating the part to be checked about a horizontal axis;
support means coupled to the base;
measuring means including: a support member vertically suspended to the support means, the member being arranged to perform substantially vertical displacements and oscillating displacements about an axis parallel to said horizontal axis; a Vee rest secured to the support member for being arranged upon the part and remaining into contact with it; and two measuring heads fixed to the support member, each measuring head having a movable arm with a relevant feeler, the movable feelers being adapted to contact diametrically opposed points of the part and the measuring heads providing relevant measurement signals; and
processing means for receiving the signals of the measuring heads and processing them to obtain at least an output signal indicating the out-of-roundness of the part.

13. The apparatus according to claim 12, wherein the processing means are adapted to process the signals of the measuring heads for obtaining a second output signal responsive to the diameter of the part.

14. An apparatus for measuring the out-of-roundness of theoretically round parts, comprising:
support means;
driving means coupled to the support means for supporting a part to be checked and rotating it about a geometrical axis;
a Vee reference device floatingly suspended to the support means for contacting two points of a cross-section of the rotating part;
two gauging heads fixed with respect to the Vee reference device and having relevant movable feelers adapted to contact diametrically opposed points of said cross-section of the rotating part, the gauging heads providing relevant measurement signals; and
processing means connected to the gauging heads for dynamically processing said measurement signals, whereby out-of-roundness due to lobing errors of the third and fifth order and the diameter of the part in said cross-section can be measured.

* * * * *